(12) United States Patent
Graham, Jr. et al.

(10) Patent No.: US 8,762,413 B2
(45) Date of Patent: Jun. 24, 2014

(54) USER DATA STORE

(75) Inventors: William W. Graham, Jr., Mill Valley, CA (US); Tushar R. Pradhan, Boxborough, MA (US); John F. Potter, Palo Alto, CA (US); Mark A. Kaufman, San Francisco, CA (US); Stephanie Lone, Pompano Beach, FL (US); Keric Donnelly, Oakland Park, FL (US)

(73) Assignee: CBS Interactive, Inc., New York, NY (US)

( * ) Notice: Subject to any disclaimer, the term of this patent is extended or adjusted under 35 U.S.C. 154(b) by 183 days.

(21) Appl. No.: 13/093,658

(22) Filed: Apr. 25, 2011

(65) Prior Publication Data

US 2012/0271860 A1 Oct. 25, 2012

(51) Int. Cl.
*G06F 17/30* (2006.01)
*G06F 7/00* (2006.01)

(52) U.S. Cl.
USPC ........... 707/790; 707/791; 707/798; 715/762; 715/763

(58) Field of Classification Search
None
See application file for complete search history.

(56) References Cited

U.S. PATENT DOCUMENTS

| | | | |
|---|---|---|---|
| 7,567,957 B2* | 7/2009 | Ferrari et al. | 1/1 |
| 2005/0131762 A1* | 6/2005 | Bharat et al. | 705/14 |
| 2007/0183670 A1* | 8/2007 | Owechko et al. | 382/224 |
| 2008/0243637 A1* | 10/2008 | Chan et al. | 705/27 |
| 2009/0112989 A1* | 4/2009 | Anderson et al. | 709/204 |
| 2011/0078140 A1* | 3/2011 | Dube et al. | 707/727 |

* cited by examiner

*Primary Examiner* — Angelica Ruiz
(74) *Attorney, Agent, or Firm* — Kacvinsky Daisak Bluni PLLC

(57) ABSTRACT

A computer system for generating a user data store and analyzing the user data store comprises a memory and a processing circuit. The memory is configured to store a user data store comprising a plurality of graphs, each graph having a user identity node. The processing circuit is configured to, for each of the plurality of graphs: receive asset data representing an asset that a user has interacted with on a website; generate a first node representing the asset data and a first link coupling the first node to the user identity node of the graph; store the first node and first link as part of the graph; receive usage data representing user interaction with a website; generate a second node representing the usage data and a second link coupling the second node to the user identity node of the graph, wherein at least one of the first node and second node further represents opinion data for a product or evaluation data for a product; and store the second node and second link as part of the graph.

14 Claims, 10 Drawing Sheets

USER DATA STORE

BACKGROUND

Web sites provide a variety of content for users to view, hear, download, and otherwise interact with. Web sites also receive user attribute data, such as user profile data, user interaction data, user likes/dislikes, user wants, etc. Some user attribute data is collected passively as a user interacts with a web site; other user attribute data is supplied directly to a web site by a user. The collection and organization of this user attribute data into a useful set of information is a complicated task.

DETAILED DESCRIPTION OF EXEMPLARY EMBODIMENTS

One or more embodiment disclosed herein may comprise a user data store configured to store large amounts of user, asset and/or site usage data in a centralized, highly scalable way to facilitate user segmentation, machine learning, data analytics and/or the creation of graphs of related entities.

One or more embodiments disclosed herein may compile data about a user from websites comprising product reviews, evaluation data, and opinion content.

One or more embodiments disclosed herein may comprise a processing circuit configured to build a graph of user data based on data from different user IDs for a same user using different web sites.

One or more embodiments disclosed herein may comprise a server computer configured to build a graph having a plurality of relationship links between a user and a same product through different web sites.

One or more embodiments disclosed herein may comprise a processing circuit configured to store a large amount of user data in the same place on a computer network. The user data may be received from a number of disjointed systems.

One or more embodiments may make the user data available for query from a client device and to respond with display data showing a unified view of the data from the various disjointed systems.

One or more embodiments may provide for ease of user data access by both machines and humans and/or the ability to easily store new types of data.

One or more embodiments may provide passive monitoring or tracking of user behavior on a variety of web sites.

Figure 1:
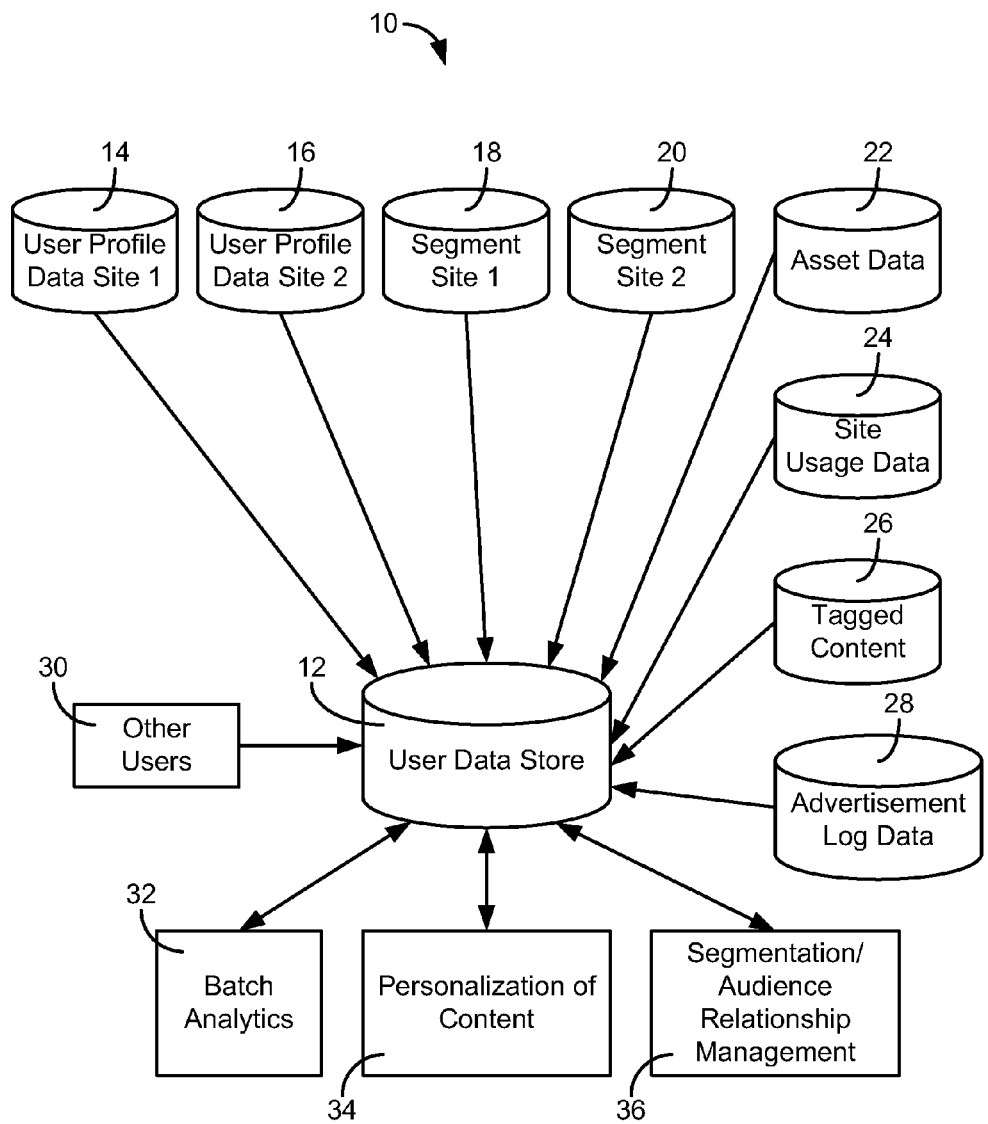
FIG. 1 is a block diagram illustrating a user data store, according to an exemplary embodiment.

FIG. 1 is a block diagram illustrating a user data store 12, according to an exemplary embodiment. FIG. 1 illustrates just some of the types of data that may be stored in user data store 12 and some of the query functionality that user data store 12 provides. User data store 12 may comprise any type of memory, database, or other computer system configured to retrieve and store metadata about a user, and to make such data available to other computers for query. The metadata about the user may take a variety of forms, such as user profile data, asset data, site usage data, tagged content, and other data about a user. A user profile data source 14 may comprise a database configured to store data about a user provided upon registration of the user at a web site, such as name, e-mail address, geographic location, hobbies, interests, etc. A second user profile data source 16 may comprise a database similar to data source 14 but for a different website. Data sources 14 and 16 may operate the same or different user registration systems, but be configured to hold user profile data for different web sites (e.g., cnet.com, bnet.com, techrepublic.com, download.com, news.com, zdnet.com, etc.). The different websites may be owned and controlled by a single corporate entity (e.g., CBS Corporation) or by multiple different corporate entities, each controlling a different website (e.g., CBS Corporation, Facebook, etc.).

A segment data source 18 may comprise segmentation data for a user indicating a market segment that the user belongs to. Segment data source 18 may comprise data generated for a particular web site or from another source, such as a third party market segmentation data source. User data store 12 may be configured to support integration or interaction with existing and new types of third-party advertising platforms such as ad exchanges and audience markets that may become a prominent method of buying and selling advertising in the future. As with user profile data source 14, 16, data for user data store 12 may retrieve segmentation data from multiple segment data sources 18, 20.

Asset data source 22 may comprise metadata about an asset, such as a catalogue asset of a web site. Assets may comprise a software product, a textual content product, a blog story, a picture, a video, an interview form, etc. Asset metadata may be updated from time to time, such as when the asset is republished or depublished to a site, when something new about the asset is derived from another process, etc. Asset data may comprise Facebook entities, asset metadata from daily ETL replications, ad metadata, etc.

Site usage data source 24 may comprise data about a user's interaction with a web site, such as content which was viewed, a web page or link or person's profile which was "Liked" by a user (by selecting a "Like" icon associated with the item), a user's purchase of a product on a web site, etc. Site usage data source 24 may comprise user generated content (UGC), such as content left on a web site by a user (e.g., comments by a user left on a blog, user reviews, opinions, ratings, voting, selecting a gotIt or wantIt or hadIt link next to a product, etc.).

A tagged content source 26 may comprise an indication of tags for content (e.g., subjects, keywords, topics, etc.) that is associated in some way with a user (e.g., a user viewed the content, an impression was given to the user of the content, the user otherwise interacted with the content, etc.). Tags and topics associated with tech products and news content (e.g., news.com, cbsnews.com, etc.) can be loaded into the user data store. Tagged content source 26 may be a separate data source than other data sources described herein or it may represent tagged content that comes along with asset data, site usage data, etc.

An advertisement log data source 28 may comprise data indicating advertisements with which a user has interacted or consumed, for example, by receiving an impression, by clicking on the impression, by making a purchase, etc. Ad log data source 28 and site usage data source 24 may store user data at the atomic level (e.g., individual items of data) or in aggregate summary form (e.g., data summarizing a large number of atomic level data items).

User data store 12 may further be configured to store associations with other users 30. For example, a user association from a social networking site (e.g., friends on Facebook.com) may be imported to user data store 12.

The data sources described herein are merely exemplary and many more sources of user data are contemplated. The data sources shown in FIG. 1 may represent one or multiple different sources, for example, data generated by different third parties, data received at user data store 12 using different software tools for retrieving data, data in different formats, data from different web sites, etc. User data stored in user data store 12 may be stored in any of a number of different formats, for example a database format, such as a relational database format. User data may be stored in a graph, as will be described hereinbelow. User data store 12 may comprise a central repository of user profiles, audience segments, and other data, which may be formulated as a graph or web that connects a user to products, content, topics, brands, editors, other users, audience segments, actions, tags, authors, etc.

User data store 12 may comprise a new user profile which can capture and encapsulate user data along various dimensions such as social (relationships and connections), behavioral (actions or activity), demographic (business-to-consumer and/or business-to-business), interest (brands, topics, etc.) and other dimensions.

User data store 12 may further be configured to receive and store activity data, such as data about user interactions with web sites, in atomic format or summary format, user session data, advertisement data summaries, etc.

User data may come from a web site that supports scrobbling, such as last.fm, such that data from the scrobbling operation may be used in generating the graph. Scrobbling is a process operable on a media consumption device, such as a digital music player, that detects metadata about songs being listened to and sends the metadata to a web site which tracks this usage. Scrobbling may be used to suggest songs, share songs of interest with friends, etc.

User data may comprise Facebook connect users/"Like"s, Facebook assets, Facebook "Like" clicks for non-Facebook connect users, Twitter user data, Gigya data, downloads, software status and update data available from TechTracker (a product of CBS Interactive, Inc.), geographic information, etc.

With data retrieved, stored and indexed or graphed in user data store 12, one or more query processes may be run on the data. A batch analytics process 32 or bulk data analytics process may be run on one or more user data files, profiles or graphs stored in user data store 12. Batch analytics processes may include joining data warehouse (e.g., a data store of user interactions with web sites) summaries and dimensions in user data store 12. Batch analytics processes may include running user clustering jobs that join users to site activity, to assets, to attributes, etc. Batch analytics may include joining "trending now" reports with metadata about assets (e.g., title, description, uniform resource locator, etc.). A content personalization process 34 may also by operated based on data requested of and retrieved from user data store 12. For example, when a user requests a web page, a web server configured to generate a web page may retrieve user data associated with the user from user data store 12 and populate the web page with content from another source selected based on the retrieved user data.

Other audience relationship management processes 36, such as segmentation, may be configured to access user data store 12. For example, a machine learning process may be configured to retrieve data indicating how users interact with one another or how users interact with web site content. As another example, a process may query user data store 12 for relationships between assets, and may traverse graphs of user data to understand these relationships. Other key-based updates and retrieval of users or assets for back-end processing may be implemented. Back-end data accesses are contemplated, as well as front-end reads to generate web pages. Audience segments generated by process 36 may comprise clusters of users grouped or characterized in different ways for marketing and targeting. A computer system using a human-guided analytical tool (e.g., a business information analyst, product manager, etc.) or a machine-driven unsupervised clustering algorithm may be used.

A reputation value calculation process may operate using data from user data store 12 to generate reputation values (i.e. badges) for users based on the user's actions, connections, and other user data stored in user data store 12. A scoring algorithm may operate to score a user's connections to a product brand (e.g., Dell computer, iPhone, Cannon, etc.), a specific product or product category (e.g., laptops, smartphones, digital cameras), or a topic (e.g., tablet PCs) and to derive an engagement or intent level for the user based on the type and strength of the relationship links, then using the score for marketing and targeting. For a web site offering product review, opinion, evaluation and similar content, such as www.cnet.com, the scoring algorithm may have particularly advantageous results due to the large quantity of such data on such a web site and the user's frequent interaction with the data.

Figure 2:
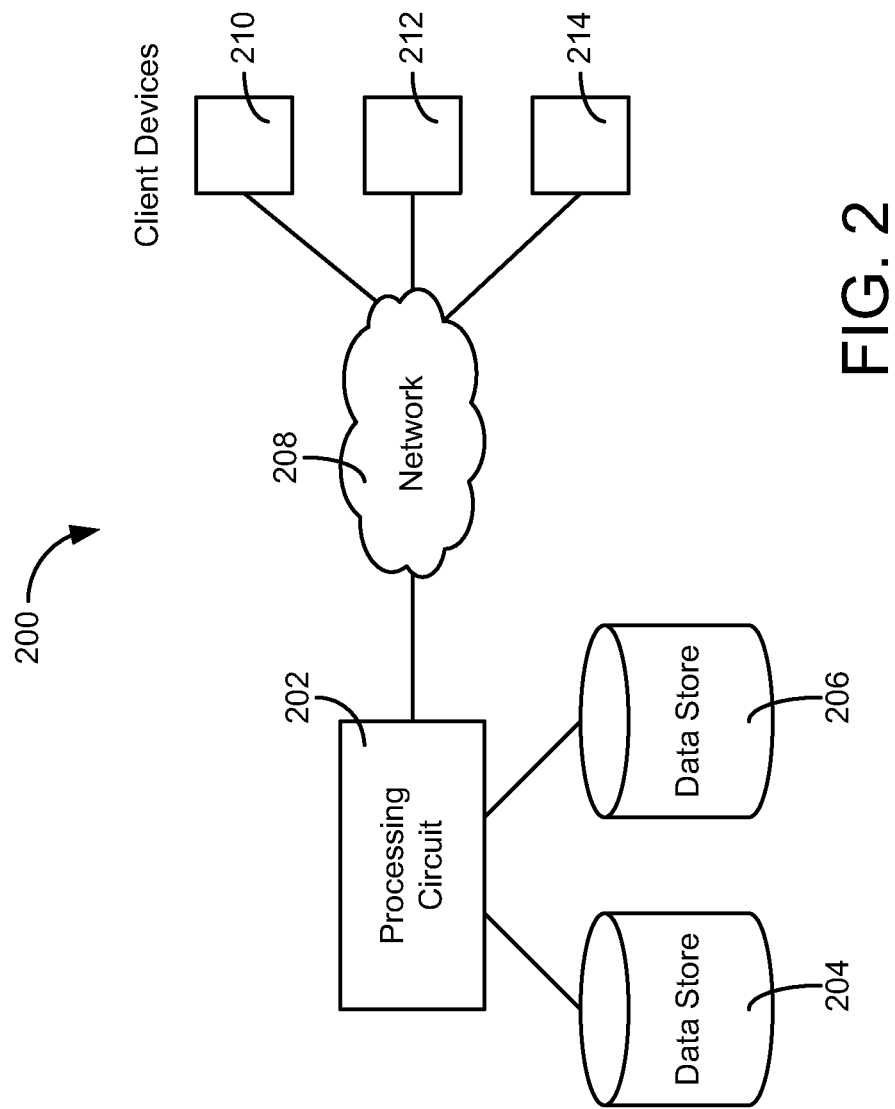
FIG. 2 is a block diagram illustrating components of a networked computer system, according to an exemplary embodiment.

FIG. 2 is a block diagram illustrating components of a networked computer system, according to an exemplary embodiment. Computer system 200 comprises a processing circuit 202 coupled to one or more data stores 204, 206. Processing circuit 202 may comprise one or more digital and/or analog circuit components (e.g., a microprocessor, microcontroller, application-specific integrated circuit, circuit board, etc.) configured as one or more computing systems, such as a server computer (e.g., web server) or other computing system. Processing circuit 202 may store data on a local memory or data stores 204, 206, which may comprise databases or other memories. Client devices 210, 212 and/or 214 comprise processing circuits, memory, network cards, etc. configured to communicate with processing circuit 202 via a network 208. Network 208 may be a local area network, wide are network (e.g., the Internet, an intranet, etc.), personal area network, comprising one or more networks of a wired and/or wireless nature (e.g., wireless cellular phone/data network, etc.). Client devices 210-214 may comprise personal computers, table computers, smartphones, terminals, etc.

Figure 7:
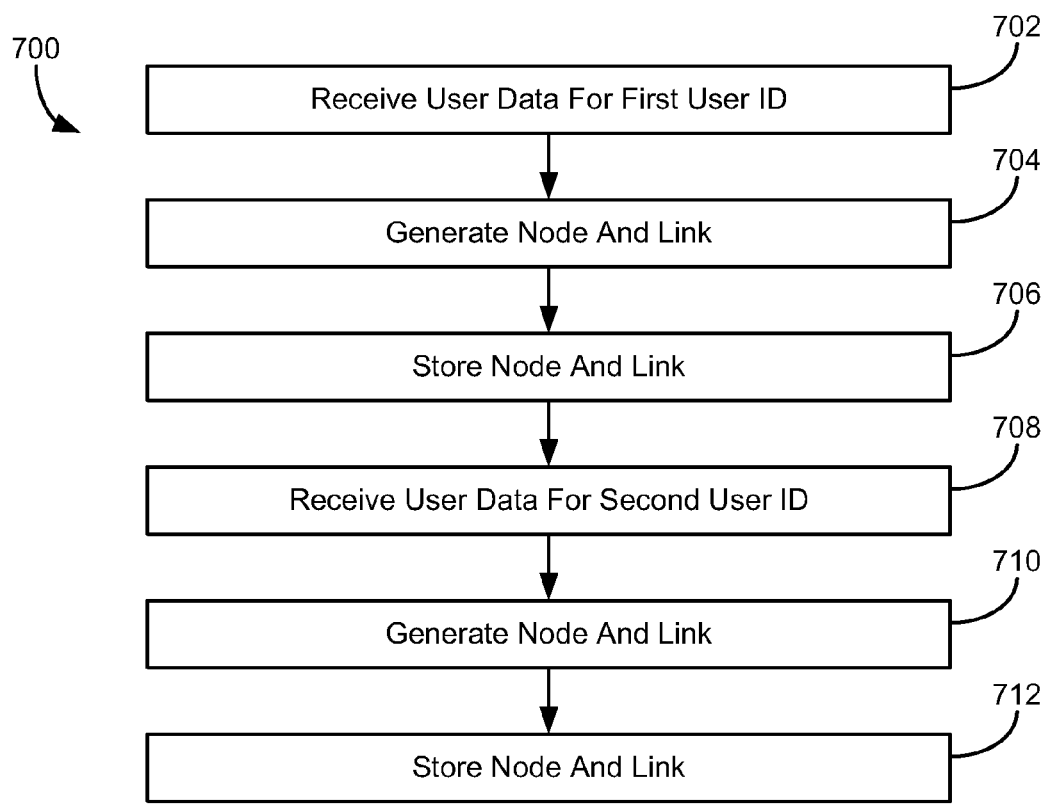
FIG. 7 is a flow diagram illustrating a method of generating a user graph, according to an exemplary embodiment.
Figure 8:
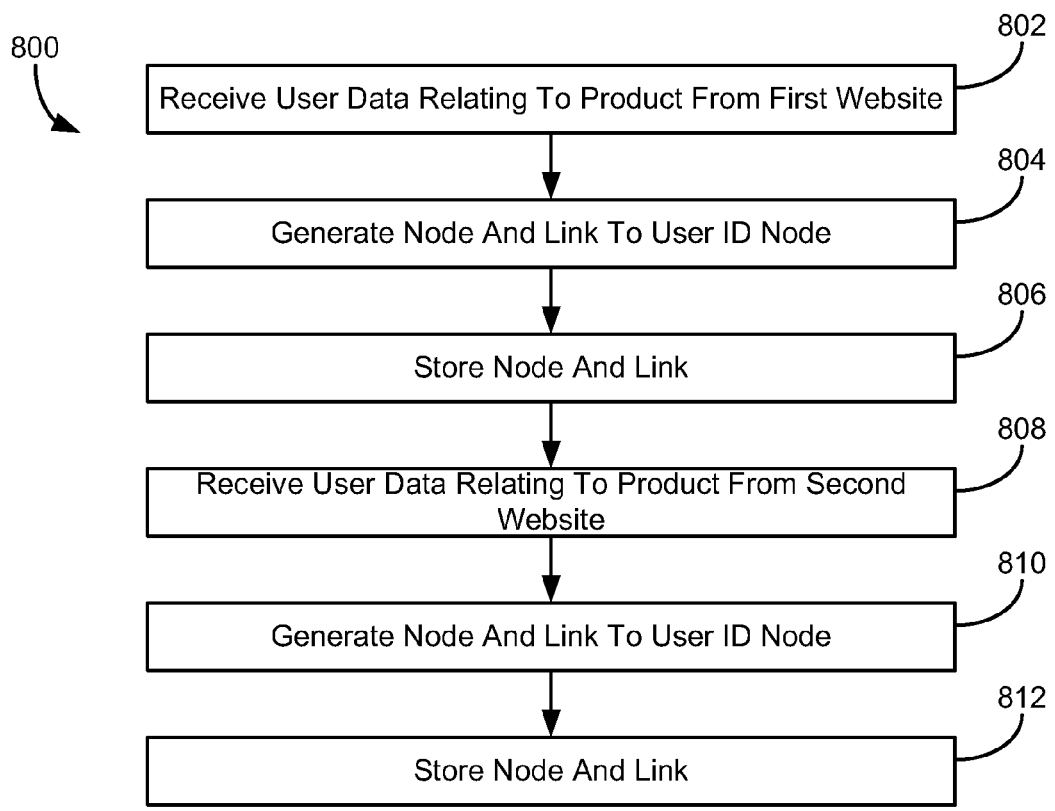
FIG. 8 is a flow diagram illustrating a method of generating a user graph, according to an exemplary embodiment.
Figure 9:
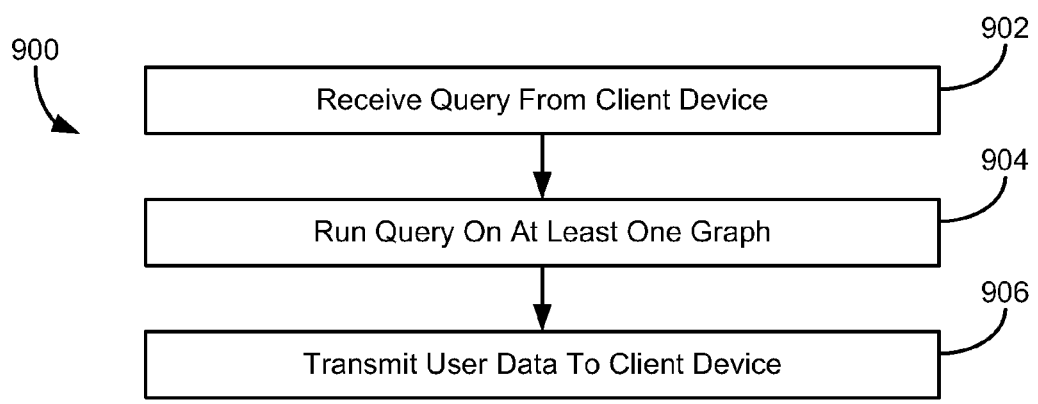
FIG. 9 is a flow diagram illustrating a method of querying a user graph, according to an exemplary embodiment.

Processing circuit 202 may be configured to operate instructions stored on a computer-readable medium (e.g., a non-transitory medium, such as a memory, hard disk drive, flash memory, etc.) to perform one or more of the functions described herein, such as the steps in the flowcharts in FIGS. 7-9. Portions of processing circuit 202 operating different functions may be referred to as modules, nodes, instructions, or circuits configured to perform functions. Processing circuit 202 may comprise the components shown in FIGS. 3 and 4, and may be configured to generate graphs of user data and display data encoding visual representations of the graphs as shown in FIG. 5.

Figure 3:
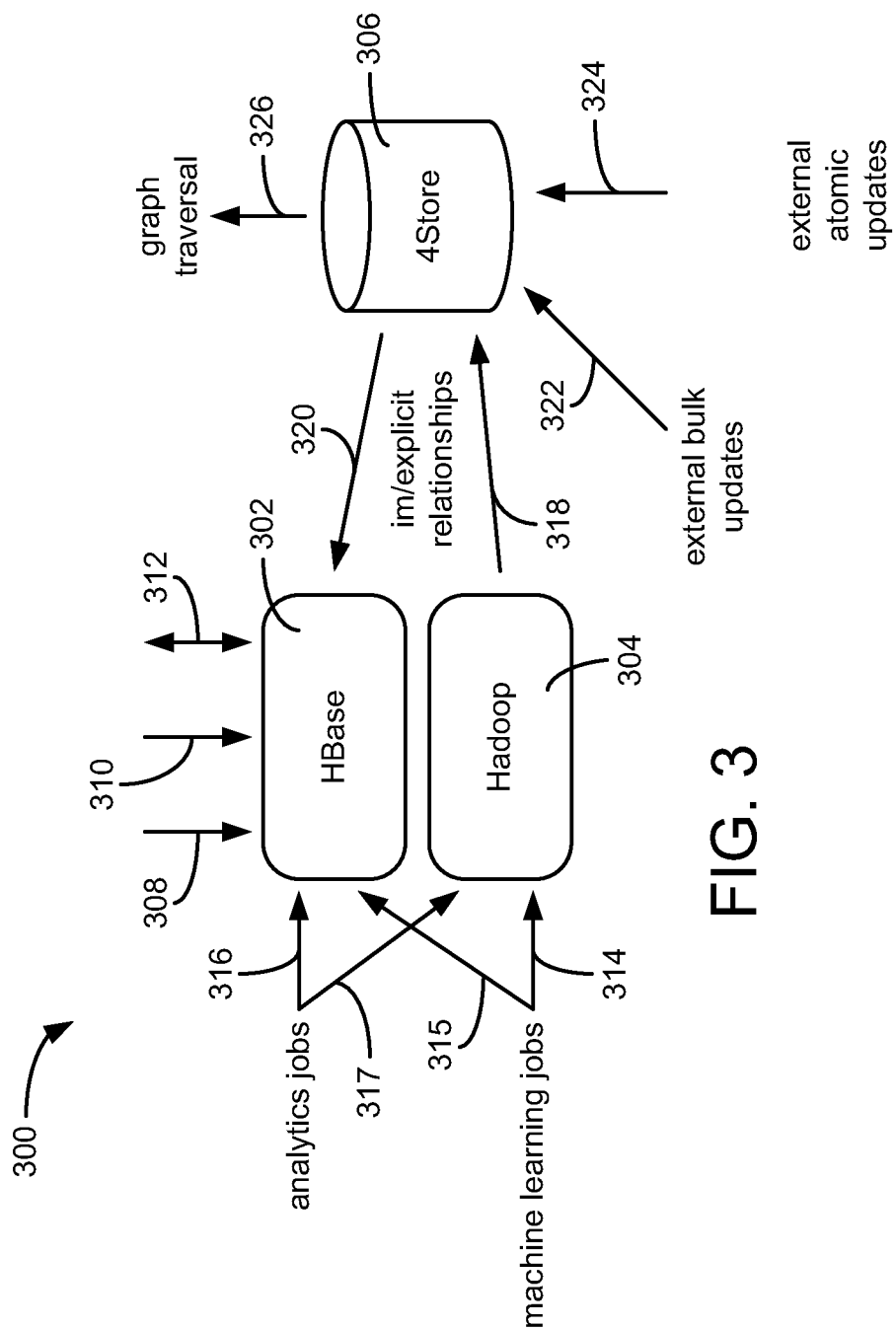
FIG. 3 is a flow diagram illustrating a user data store, according to an exemplary embodiment.

FIG. 3 is a flow diagram illustrating a user data store, according to an exemplary embodiment. User data store 300 comprises a distributed file system 304, a distributed database 302, and a database storage and query engine 306. Distributed file system 304 provides high throughput access to application data stored in engine 306. In one embodiment, a Hadoop Distributed File System provided by the Apache Software Foundation may be used. The Apache Hadoop project develops open-source software for reliable, scalable, distributed computing (see hadoop.apache.org via the web). A distributed database 302 operating on top of distributed file system 304 is a scalable, distributed database that supports structured data storage for large tables. In one embodiment, a Hadoop HBase database provided by the Apache Software Foundation may be used. HBase is a distributed column-oriented data store. HBase is suited for low-latency (tens of milliseconds) read/writes of atomic records in distributed file system 304. HDFS and MapReduce are suited for bulk updates of data and batch jobs. MapReduce is a software framework for distributed processing of large data sets on computer clusters, also provided by the Apache Software Foundation. Using HBase on top of HDFS provides both highly-scalable atomic data access as well as batch processing.

Distributed database 302 is configured to provide back-end high volume read/write storage for all user metadata and asset metadata. Database 302 is configured to receive and store streaming data writes (arrow 308) and bulk data loads (arrow 310) of user data from one or more data sources. Database 302 is further configured to receive random access read/write storage (arrow 312) from one or more data sources. Database 302 may be configured to gather data and run algorithms, with sets of aggregated or summarized results from database 302 being transferred to and stored in data store 306, which in turn may be configured as an ad-hoc traversal engine for user graphs.

Database storage and query engine 306 is configured to store graphs of user data. In one exemplary embodiment, a 4store engine may be used as the database storage and query engine of user data store 300. 4store is a platform provided by Garlik (see 4store.org via the web) available under the GNU General Public License, written in ANSI C99 and designed to run on UNIX-like systems, such as Linux. 4store holds RDF (Resource Description Framework) data, a metadata data model, and is suitable for storing classes of entities as vertices (or nodes) and the relationships between them as edges (or links). Graph store 306 can be queried for entities by various criteria related to location and attributes within a graph.

Keys for assets/entitites may comprise an assetId and assetType. The values may be stored in column families named for the data source, to have families of data for the same key.

Distributed file system 304 is configured to facilitate back-end analysis, for example analytics job queries (arrow 316), machine learning job queries (arrow 314), which may be received from other client computers under human or machine control. Machine learning and analytics jobs may also execute on distributed database 302 (as shown by arrows 315, 317).

Graph store 306 is configured to receive and store external bulk updates (arrow 322) and external atomic updates (arrow 324). External bulk updates 322 may be received from distributed file system 304 or from another source. For example, relationships between authors and their content may be loaded directly from an authoritative relational database in a content management system (CMS) to graph store 306. External atomic updates 324 may be triggered by and received from a publishing system as a particular news story goes live on a web site, which may bypass distributed file system 304. Graph store 306 is configured to provide graph traversal data to a client device in response to a query (for example, a query to view a user graph, click through a node of a user graph to another user graph or asset graph, etc.). Database 302 may also be configured to receive graph-based updates or results from data store 306 (arrow 320). The components of FIG. 3 are merely exemplary and may be replaced with other components or systems.

Figure 4:
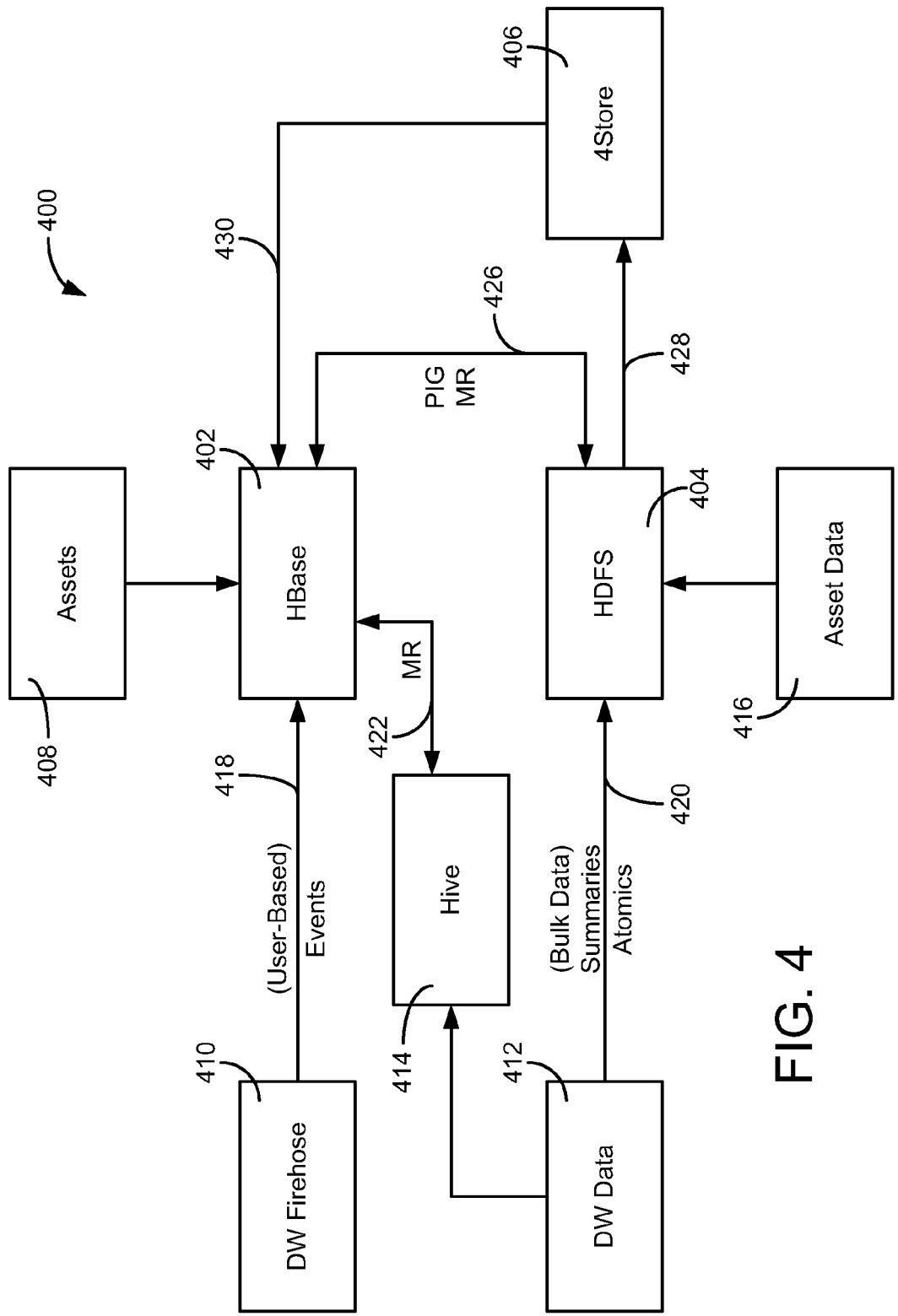
FIG. 4 is a more detailed flow diagram of the user data store of FIG. 3, according to an exemplary embodiment.

FIG. 4 is a more detailed flow diagram of the user data store of FIG. 3, according to an exemplary embodiment. User data store 400 comprises components 402, 404 and 406, which are similar to the corresponding components in FIG. 3. Asset data sources 408 and 416 provide asset data to both distributed database 402 and distributed file system 416. A source of user website interaction or activity data 410 (e.g., called a data warehouse firehose) is configured to provide a stream of real-time user-based events, such as website interactions (e.g., signing up for a newsletter offered by the web site, viewing certain content, signing up for a fantasy sports team, etc.), to distributed database 402 for storage and retrieval by other sources. A source of bulk data or data summarizing website interaction or activity data 412 is configured to provide summary data to distributed file system 404. In some embodiments, atomic-level data may also or alternatively be provided along line 420.

Hive module 414 may be optionally provided in user data store 400. Alternatively, a Pig module may be used. Hive and Pig are higher-level languages above Hadoop MapReduce and HDFS. Pig jobs export NTriples files containing user graph data to be imported into 4store. Hive or Pig module may be configured to provide a level of abstraction above the low-level MapReduce APIs and the data stored in HDFS. Using Hive or Pig, developers can more easily write MapReduce workflows in a few lines of scripts, which get translated by the Hive/Pig framework into a series of MapReduce jobs. A Pig module may be configured to load raw data from distributed file system (e.g., HDFS) 404 into distributed database (HBase) 402, as shown by arrow 426 and then to generate RDF in distributed file system 404 from distributed database 402, as shown by arrow 426.

As shown by arrow 422, datawarehouse data source 412 may use a Hive module 414 as a facade or interface module to datawarehouse data. Hive module 414 may be configured to import atomic or sessionized datawarehouse data from data source 412 into distributed database 402 (arrow 422). Hive module 414 could be replaced with a Pig module and vice-versa. Arrow 428 indicates how RDF data may be retrieved from distributed file system 404 at graph store 406 in bulk. Arrow 426 indicates a Pig job that generated RDF flat files of relationships in distributed file system 404. Arrow 428 indicates loading the flat files into graph store 406. Arrow 430 indicates an optional feature of receiving data from graph store 406 into distributed database 402, for example in the case where data is imported from an external source into graph store 406.

As shown in FIGS. 3 and 4, some embodiments described herein may integrate such components as HDFS, MapReduce, HBase, graph store, publishing systems, etc., to provide one or more functionalities or use cases described herein. Also as shown in FIGS. 3 and 4, the components may be configured to bulk load data between or within data stores, incrementally update data between or within data stores, and/or export data into other systems, either incrementally or in batch mode.

User data stores 12, 300, 400 may be configured to fetch or retrieve data about a user and to update specific parts of the user data at times. For example, the data can be updated when the user takes action on a web site tied to the user data store. Also, the data can be updated when another data source derives something about the user, such as an interest of the user, want of the user, connection to another user, etc.

Data stored in user data stores 12, 300, 400 need not be the most authoritative version of user data stored therein. User data in these stores hold mirrors of data whose authority reside elsewhere. User data stores may be configured to keep data consistent between authoritative data stores and those in the user data stores, for example, through synchronization, data calls, pull and/or push systems, etc. In an alternative embodiment, the user data stores may be co-located with one or more data sources (e.g., a data warehouse data source) in a common server cluster, such as a Hadoop cluster. In some embodiment, extract, transform, and load (ETL) functions may be implemented to maintain mirrored data.

Figure 5A:
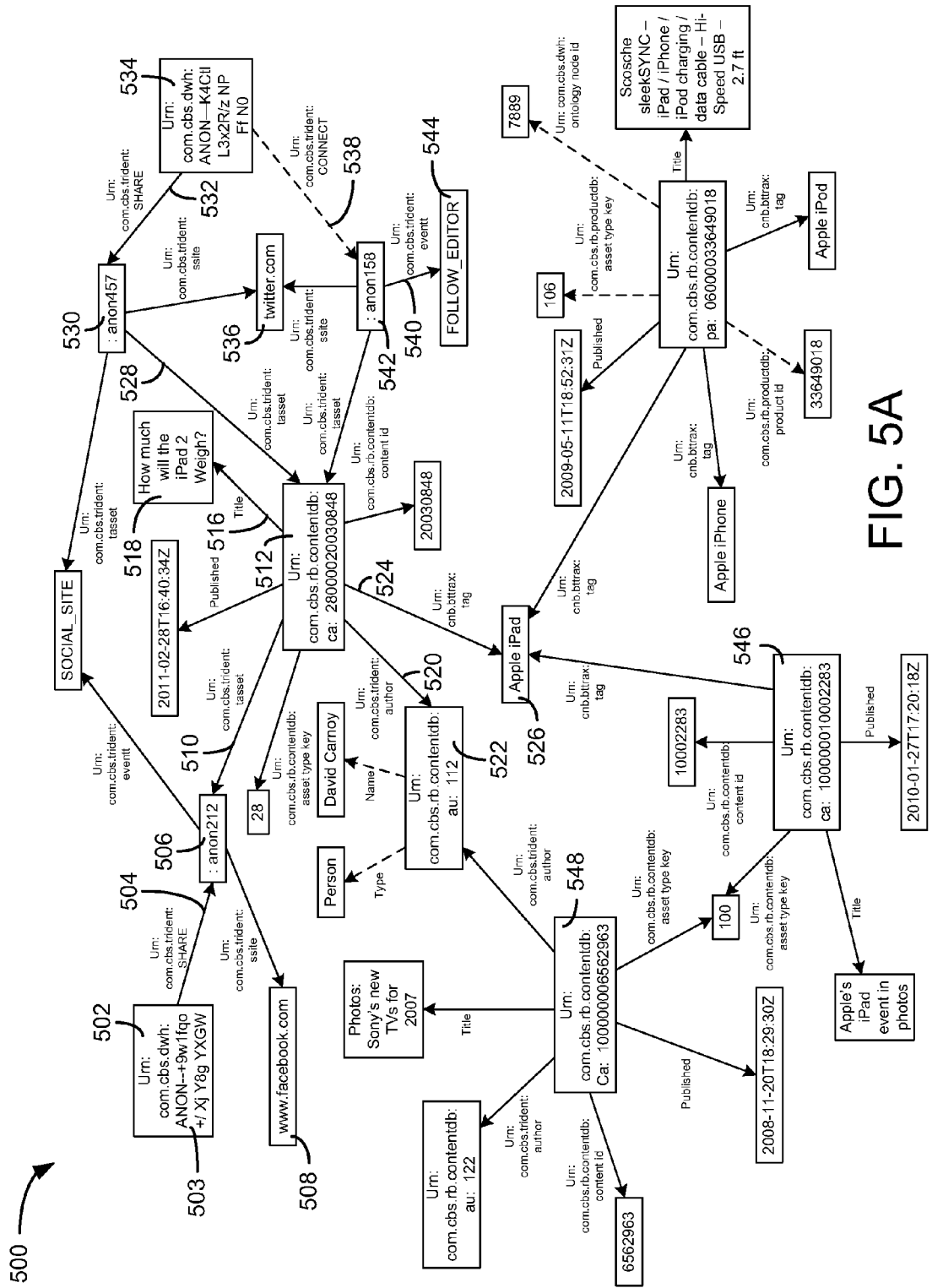
FIGS. 5A and 5B are illustrations of graphs for users, according to exemplary embodiments.

FIG. 5A is an illustration of a graph for a user, according to an exemplary embodiment. The user data stores described above may be configured to generate and/or store data in graph form. A graph is a data structure for storing user data, and may take a variety of forms when stored in a database or memory. A graph can conceptually comprise nodes or vertices connected by edges, links or arcs. Links connect nodes of related entities, for example, users or content.

Graphs comprise a user node representing a particular user. The user may be a synthesis of multiple identities used by a same real person on different web sites, sources, properties or locations, or different clients and devices used by the same person. These multiple user identities may comprise anonymous identities (e.g., cleargif cookies), registration identities (user registration system or URS, UREG identities), social identities (e.g., an identity associated with a social networking web site such as Facebook, LinkedIn, etc.), etc. User data may be associated with these specific identities. The user profile stored in the user data store is a composition of data from the multiple entities that have been correlated to represent the same person. The nodes each may represent users, products, topics, assets, content, etc.

Connections between users and other objects in the graph can be made up of multiple relationship links. For example, the connections between a user and a product can have one or more relationship links or relationship link types, such as searchedFor (e.g., an product, topic, asset, etc. that a user searched for), sawReviewOf (e.g., something a user saw a review of on a web site), clickedAdFor (e.g., something a user clicked an ad relating to), gotIT (e.g., something a user already owns), wantIt (e.g., something a user would like to own), hadIt (e.g., something a user used to own but no longer owns), downloadedPaper (e.g., a white paper, article or other content piece downloaded by a user), downloadedTrial (e.g., a software package or other item of which a user downloaded a trial version), follows (e.g., something a user has interest in, as indicated by search queries, web site interaction data, etc.), likes (e.g., something a user has indicated they like using a "like" button on a web page associated with content), etc. In some examples, these connections may be detected by a web site actively by detecting that a user has selected a "gotIt" link or button next to a product, article, etc.

Links on the graph may be based on connections or relationships of users to products, topics, content, actions, tags, authors, etc., and connections between and among all of these things. When presented visually, the graph may illustrate groupings around certain items or nodes that may be informative.

To illustrate exemplary functionality embodied in user graphs, several nodes/links in FIG. 5A will be described. Box 502 represents an anonymous user (as indicated by the ANON part of the user ID 503). Link 504 indicates that the anonymous user 502 has shared an item named :anon212 by the graph store), which is on the social site Facebook 508. The shared asset or item 512 is shown linked to :anon212 at link 610. Asset 512 is a content asset with a long ID 514 ending in 0848. The user graph 500 further comprises a link 516 to title metadata 518 representing the title of the article, a link 520 to an author node 522 having an author ID (112 in this case) and a link 524 to tag data or node 526 (e.g., "Apple Ipod" in this case). The user graph 500 further comprises a link 528 to another user 534 (via link 532 and node 530), who is another anonymous user in this case, who has shared the asset 512 via twitter 536 and followed the editor via the web site, as shown by links 538, 540 and nodes 542, 544. User graph 500 further shows that the graph may be traversed from the Apple iPad tag 526 to another piece of content 546 to yet another piece of content 548 by the same author (David Carnoy, au: 112).

Figure 5B:
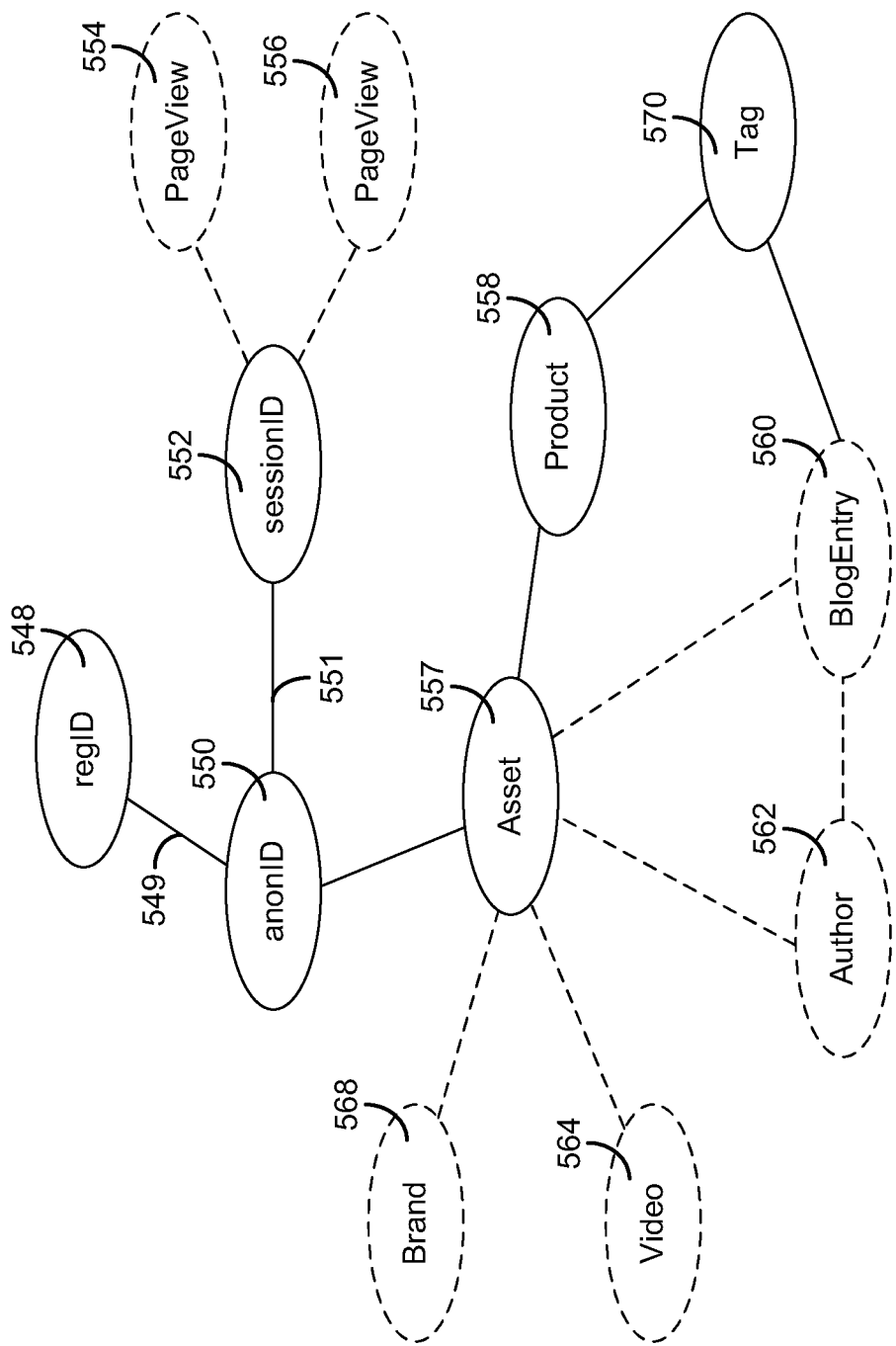

Referring now to FIG. 5B, this figure illustrates a conceptual graph of relationships. The graph illustrates how a person represented by a user node 550 is a same person who has had a session with ID session ID 552. The person associated with session ID 552 has two page views 554 and 556. A link 551 connects an anonymous ID 550 for the person with a session ID 552 for the person. Another link 549 may connect anonymous ID 550 with a registered user ID 548. The anonymous ID 550 can also have had actions or interactions with assets 557 of various types, such as a product 558, a blog entry 560, an author 562, a video 564 and a brand 568. A tag 570 may be linked to a product 558 and a blog entry 560.

As can be seen, the system may now use graph connections to determine information about a user. In one embodiment, the system may be configured to generate a personalized update of content to a user of a web site or via an e-mail, text or other message, based on graph connections (e.g., authors, products, brands, etc.). In another embodiment, a user may be specifically targeted for an offer or other content based on graph connections. In another embodiment, a message or content may be sent to a user based on suggested people (e.g., editors, other user) or objects (e.g., topics, products, brands, etc.) that the user may be interested in following. In another embodiment, relationships or actions such as Got It—Want It—Had It data may be used to suggest related products for targeting/re-targeting. In another embodiment, the system may be configured to cluster together like-minded users (e.g., by generating a segment or list of user identifiers with a similar interest) to suggest things or people to follow (e.g., via content pushed to the user while viewing the site, specific targeted ad campaigns, e-mails, etc.).

The received data from the data sources may comprise metadata sufficient to connect users to actions to products to tags to content to authors to user, and every permutation thereof. For example, users ->actions: this metadata connects users to their social or user-generated content actions. This may include explicit actions that connect users to products, authors, brands, etc. The data warehouse firehose is one source of such metadata. Actions->Products: this metadata is a linkage from an action to a product and can be used to pull in a more user-readable product name to a display, since traversal to other entities on the graphs can use a product ID. This product metadata can be stored in the bulk-loaded product table in HBase. Products->tags/topics: this metadata can associate products with tags from content. News content->tags/topics: this metadata can associate or link news content with tags or topics about the content. News stories->authors: this metadata can associate news stories with the associated authors of those stories.

In still further embodiments, a weighted recommendation may be generated based on a strength of a graph link or edge, for example, the closeness of a user to a product or asset, the number of user links to a product or asset, or the weighted number of user links to a product or asset based on a first weighting for a link to a product category and a second, greater weighting for a link to a product within the product category. In another embodiment, the system may be configured to provide suggested connections to the user to implicit/explicit relationships. An explicit relationship may be one triggered by a direct interaction of the user. For example, if a user "like"s a product, an explicit "user likes X" relationship is generated. An implicit relationship may be one that for which the system has derived via some type of analysis of other data. For example, if a user spends time looking at camera lenses, the system might generate an implicit relationship that the "user is probably a photographer." As another example, if a user X interacts with the same type of content as user Y, the system may be configured to generate an implicit relationship that "X has similar taste as Y." As another example, if a user looks at a lot of video games, the system may be configured to say implicitly that the user may be a male age 18-25, since that is a game demographic.

In another embodiment, internal business intelligence metrics may be run on the user data store and graphs therein to report connections for audience management and study. In another embodiment, a user interface tool may be configured to illustrate a graph and graph connections and allow a product manager or marketing manager to traverse the graph connections, view them, click through to other graph nodes and connections, access nodes, etc. In another embodiment, the system may be configured to store a history of graph connections so that changes in connections and their timing may be illustrated (e.g., when did the user start/stop liking Dell computers, for example). In another embodiment, user-to-user relationships or entity-to-entity relationship may be generated by looking at shared interests. An entity may be any business entity (e.g., a user, tech product, blog entry, etc.). Entities may comprise users or assets, where assets are all entities that are not users.

Figure 6:
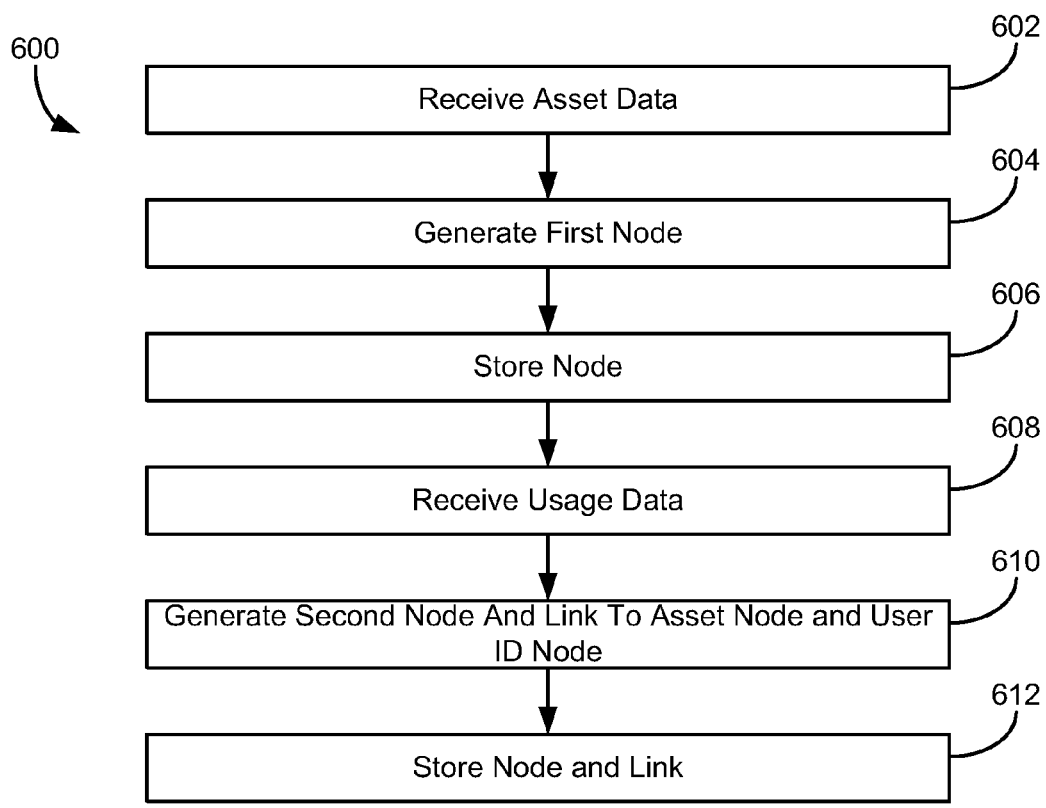
FIG. 6 is a flow diagram illustrating a method of generating a user graph, according to an exemplary embodiment.

FIG. 6 is a flow diagram illustrating a method of generating a user graph, according to an exemplary embodiment. In this embodiment, the user data store is configured to generate or build a graph of user data, asset data, and/or usage/activity data from one or more website comprising product review/evaluation data and opinion content related to or specific to the user. A computer system comprises a memory and processing circuit. The memory is configured to store a user data store comprising a plurality of graphs, each graph having at least one user identity node. At block 602, the processing circuit is programmed or configured to receive asset data representing an asset that a user has interacted with on a website. The asset data may be some metadata about the asset. At block 604, the processing circuit generates a first node representing the asset data. At block 606, the processing circuit stores the first node as part of the graph in a memory. At block 608, the processing circuit receives activity data or usage data representing user interaction with a website. The usage data may represent some user activity associated with the web site, such as viewing a newsletter, signing up for a fantasy league, "Like"-ing a page or some content, etc. At block 610, the processing circuit generates a second node representing the usage data and a link coupling the second node to the user identity node of the graph. At block 612, the processing circuit stores the second node and second link as part of the graph. The graph may be used for various queries, as described herein and with reference to FIG. 9.

In one embodiment, at least one of the asset data and usage data represents, is based on, or relates to opinion data for a product or evaluation data for a product. The opinion data may be provided by a writer for the web site, or by a front-end user of the web site. The opinion data or evaluation data may include comments about a particular product or service or a category of products or services. For example, the opinion/evaluation data may comprise product ratings based on tests conducted, comparison data with similar products, a video describing key features of the product, etc. The opinion/evaluation data may comprise an editorial, analysis, or other content, and may be part of an iterative feedback process. The user may be coming to the site in a purchasing mode, or perhaps in a research/study mode.

The processing circuit may be configured to generate and store other nodes on the graph based on user data received from various data sources, such as nodes for audio and/or video media interacted with by the user. The metadata may relate to entertainment, games, news and other media, nightly television show ratings and demographics regarding viewers. The metadata may also relate to software and installers downloaded to a user's computer, including software which scans the user's computer to detect computer configurations such as operating system, applications present, hardware profile, etc. The metadata may also relate to product specifications of products. The breadth of these types of data which may be available provide a rich array of data about a user and the user's activity from which to understand the user's behavior better and better tailor content, offers, etc. for the user's consumption.

FIG. 7 is a flow diagram illustrating a method of generating a user graph, according to an exemplary embodiment. In this embodiment, the user data store is configured to build a graph of user data based on data from different user IDs for a same person using different sites. The user data store may be configured to associate or correlate an anonymous user ID received from a first data source with one or more registered user IDs used over a predetermined period of time. The user data store may be configured to associate a registered user ID with one or more anonymous user IDs used over a predetermined period of time. In one example, the user data store may be configured to relate an anonymous user with a Facebook user and/or with a URS registered user for another website. The user data store may be configured to link a plurality of user sessions/identifiers together for form a concept of a single person, represented as a user identity node in a graph. Thus, when querying the user data store, the query may include any identifier associated with the person (e.g., anonymous ID, registered ID, Facebook ID, etc.) to access a representation o the same person. In one embodiment, a universal user ID may be generated by the user data store.

At process 700, a computer system is configured to generating a user data store. The computer system comprises a memory configured to store a user data store comprising a plurality of graphs, each graph having a user identity node. At block 702, the processing circuit is configured to receive first user data representing user interaction with a first website while a person is associated with a first user identifier for the first website. At block 704, the processing circuit generates a first node representing the first user data and a first link coupling the first node to the user identity node for the graph. At block 706, the processing circuit stores the first node and first link as part of the graph. At block 708, the processing circuit receives second user data representing user interaction with a second website while the same person is associated with a second user identifier for the second website. The processing circuit is configured to determine that the second user identifier is associated with the first user identifier. In one embodiment, the correlation of first user ID to second user ID can be done by tracking the user who browses the site over the course of a transition from being logged-in to being logged-out, or vice-versa. The anonymous user ID (e.g., cookie) from the logged-out browsing can be associated with the registered user ID when the user is browsing in a logged-in mode. In another embodiment, if a user browsing on a first site sees a page that links to a log-in screen for a second site, the log-in data from the two sites may be correlated and indicated as representing the same person. In another embodiment, if a user supplies a phone number for example passively through a mobile device application or actively, the phone number may be used to correlate a user with other data to conclude that two different user IDs are the same person. As another example, a correlation may be made when an anonymous user takes a social action, such as clicking on a tweet button for example. In this case, the system may be configured to determine the user's twitter ID and associate that with the anonymous ID. At block 710, the processing circuit generates a second node representing the second user data and a second link coupling the second node to the user identity node for the graph. At block 712, the processing circuit stores the second node and second link as part of the graph. The graph may be used for various queries, as described herein and with reference to FIG. 9. By correlating or connecting user IDs received from different data sources, the user data store connects information about a user from their activity at a work computer, home computer, mobile device and across web pages, such as Facebook, cbssports.com, etc.

In one example, the first web site may be a social networking web site (e.g., Facebook, LinkedIn, Myspace, Twitter, etc.) and the second web site may be a non-social networking web site (e.g., a news site, etc.).

In another example, the first and second web sites may by owned or controlled by the same corporate entity (e.g., CBS Corporation, owning cnet.com, cbssports.com, download.com, etc.), and some of these different web sites may even use the same registration software tool, though the user maintains different registration IDs with each different web site. These different web sites (business news, sports, music, games, etc.) represent a range of activities that a user engages in. The method of FIG. 7 may be employed to unify user data across this range of activities to provide a synergistic source of user data.

FIG. 8 is a flow diagram illustrating a method of generating a user graph, according to an exemplary embodiment. A computer system may be configured to build a graph having multiple relationship links between a user and a same product, based on activity of the person associated with the user through different web sites. For example, a user graph may store data indicating a user "Like"d a Dell computer on Facebook and also looked at Dell computer reviews on cnet.com.

Process 800 describes a method of generating a user data store having a graph associating user activity relative to a product across different web sites. A computer system comprises a processing circuit and a memory configured to store a user data store comprising a plurality of graphs, each graph having a user identity node. At block 802, the processing circuit is configured to receive user data representing user interaction with a product at a first website. At block 804, the processing circuit generates a first node representing the first user data and a first link coupling the first node to the user identity node for the graph. At block 806, the processing circuit stores the first node and first link as part of the graph. At block 808, the processing circuit receives second user data representing user interaction with the same product at a second, different web site. At block 810, the processing circuit generates a second node representing the second user data and a second link coupling the second node to the user identity node for the graph. At block 812, the processing circuit stores the second node and second link as part of the graph. The graph may be used for various queries, as described herein and with reference to FIG. 9.

In one example, the first user interaction may be a user viewing a product review for the product and the first user data comprises metadata representing this interaction. The second user interaction may comprise receiving an opinion on the product from a user and, again, the second user data comprises metadata representing this content or interaction. The opinion on the product may indicates that the user "Like"s the product. Another node in a graph may be metadata indicating a user shared a link about a product, or a link to content having specific tags.

FIG. 9 is a flow diagram illustrating a method of querying a user graph, according to an exemplary embodiment. As described hereinabove, a wide range of graph queries for a wide range of purposes is contemplated. The querying may be one portion of analyzing the data, which can take place under human or machine control. At a block 902, the processing circuit of the user data store is configured to receive a query from a client device. At a block 904, the processing circuit is configured to run the query on at least one of the graphs. At a block 906, the processing circuit is configured to transmit at least some of the user data from the graphs based on the query to the client device. This or other processes may be configured to convert the user data to display signals to display the results in a variety of formats, such as textual, graphical, columnar, and other formats.

Various use cases or scenarios of the user data stores described herein have been shown. A user interface may be provided for analysts and product managers to access, search, query, traverse or otherwise study the user data store. In one exemplary embodiment, an Allegrograph graph database may be used to provide a user interface, provided by Franz, Inc., Oakland, Calif. The user interface may provide a web-bases browser tool that provides the ability to issue SPARQL and Prolog queries and see the results in tabular form. SPARQL is a SPARQL Protocol and RDF Query Language standardized by the RDF Data Access Working Group (DAWG) of the World Wide Web Consortium. The user interface may be a client-side Linux desktop application that allows the ability to view and traverse graphical representations of the graph.

Additional use cases include certain analytics goals for higher-latency jobs, such as running a report of what items on a web site are most liked on Facebook across users, joining data warehouse summaries with dimensional data, joining trending data with dimensional data, ad hoc analysis, jobs to determine which users are influencers of other users, jobs to determine related users and/or content, and user interface access for analysts and product managers to run jobs.

The user data store may be queried for all users recently modified or all assets recently modified. The user data store may be queried to identify user to user relationships via shared interest, or entity-to-entity relationship.

One exemplary query may be to find ten users with a "want it" event. Another exemplary query may be to find ten users who have shared an asset (content or product) on Facebook, and the asset title and optional Graffiti tags. Another exemplary query may be to find ten users who shared a content asset tagged with 'Apple MacBook' on Facebook, and the content title and id. Another exemplary query may be to find ten users who shared a product asset on Facebook, and the product name and id.

User of the term "coupling" when referring to nodes herein encompasses both a direct connection and an indirect connection through other intervening nodes.

What is claimed is:

1. A computer system for generating a user data store and analyzing the user data store, comprising:
    a memory configured to store a user data store comprising a plurality of graphs, each graph having a user identity node; and
    a processing circuit configured to, for each of the plurality of graphs:
        receive asset data representing an asset that a user has interacted with on a website, the asset from a catalogue of assets for the website;
        generate a first node representing the asset data;
        store the first node;
        receive usage data representing user interaction with a website;
        generate a second node representing the usage data and a link coupling the second node to the user identity node of the graph and the first node, wherein at least one of the first node and second node further represents opinion data for a product or evaluation data for a product; and
        store the second node and link as part of the graph;
    the processing circuit further configured to:
        receive a query from a client device;
        run the query on at least one of the graphs; and
        transmit at least some of the user data from the graphs based on the query to the client device.

2. The computer system of claim 1, wherein the processing circuit is further configured to:
    generate a third node representing asset data or usage data representing audio and/or video media and a third link coupling the third node to the user identity node of the graph; and
    store the third node and third link as part of the graph.

3. The computer system of claim 1, wherein the query is received as part of a batch analytics process.

4. A computer system for generating a user data store and analyzing the user data store, comprising:
    a memory configured to store a user data store comprising a plurality of graphs, each graph having a user identity node; and
    a processing circuit configured to, for each of the plurality of graphs:
        receive first user data representing user interaction with a first website while a person is associated with a first user identifier for the first website;
        generate a first node representing the first user data and a first link coupling the first node to the user identity node for the graph;
        store the first node and first link as part of the graph;
        receive second user data representing user interaction with a second website while the person is associated with a second user identifier for the second website;
        generate a second node representing the second user data and a second link coupling the second node to the user identity node for the graph; and
        store the second node and second link as part of the graph;
    the processing circuit further configured to:
        receive a query from a client device;
        run the query on at least one of the graphs; and
        transmit at least some of the user data from the graphs based on the query to the client device.

5. The computer system of claim 4, further comprising determining that the same person is associated with the first user identifier and the second user identifier.

6. The computer system of claim 4 wherein the user data comprises metadata for content received by the user.

7. The computer system of claim 4 wherein the first website is a social networking website and the second website is not a social networking website.

8. The computer system of claim 4 wherein at least one of the first user identifier and the second user identifier is an anonymous user identifier and the other is a registered user identifier.

9. The computer system of claim 4 wherein the query is received as part of a batch analytics process.

10. A computer system for generating a user data store and analyzing the user data store, comprising:
    a memory configured to store a user data store comprising a plurality of graphs, each graph having a user identity node; and
    a processing circuit configured to, for each of the plurality of graphs:
        receive first user data representing user interaction with a product at a first website;
        generate a first node representing the first user data and a first link coupling the first node to the user identity node for the graph;
        store the first node and first link as part of the graph;
        receive second user data representing user interaction with the product at a second website;
        generate a second node representing the second user data and a second link coupling the second node to the user identity node for the graph; and
        store the second node and second link as part of the graph;
    the processing circuit further configured to:
        receive a query from a client device;
        run the query on at least one of the graphs; and
        transmit at least some of the user data from the graphs based on the query to the client device.

11. The computer system of 10, wherein the first user interaction comprises a user viewing a product review for the product.

12. The computer system of 11, wherein the second user interaction comprises receiving an opinion on the product from a user.

13. The computer system of claim 12, wherein the opinion on the product indicates that the user likes the product.

14. The computer system of claim 10, wherein the query is received as part of a batch analytics process.

* * * * *